United States Patent
Beyda et al.

Patent Number: 6,012,130
Date of Patent: Jan. 4, 2000

[54] METHOD AND APPARATUS FOR AUTOMATED DISK DRIVE UPGRADES

[75] Inventors: William J. Beyda, Cupertino; Shmuel Shaffer, Palo Alto, both of Calif.

[73] Assignee: Siemens Information and Communication Networks, Inc., Boca Raton, Fla.

[21] Appl. No.: 08/923,662

[22] Filed: Sep. 4, 1997

[51] Int. Cl.⁷ .................................................. G06F 12/02
[52] U.S. Cl. .............................. 711/173; 711/4; 711/112; 711/170; 711/172
[58] Field of Search .................................... 711/173, 112, 711/111, 170, 171, 172, 4

[56] References Cited

U.S. PATENT DOCUMENTS

| | | | |
|---|---|---|---|
| 5,675,769 | 10/1997 | Ruff et al. ................................. | 711/173 |
| 5,706,472 | 1/1998 | Ruff et al. ................................. | 711/173 |

OTHER PUBLICATIONS

"Drive Image" by PowerQuest, 1998.
"DriveCopyWins DC Direct Best Buy" PowerQuest, 1998.
"Partition Magic" PowerQuest, 1998.
"Drive Copy 2.0" Power Quest, 1998.

*Primary Examiner*—Eddie P. Chan
*Assistant Examiner*—Than V. Nguyen

[57] ABSTRACT

A computer executable program method for automating the upgrade of a storage medium, such as a disk drive, in a computer system is disclosed. The computer based method is preferably implemented with a series of computer-executable instructions stored on a computer-readable medium, such as a magnetic disk or CD-ROM. When executed on a computer, the program method automatically performs the series of operations needed to configure, partition and format the upgrade disk drive. The method also provides the option of adjusting system parameters so as to account for any changes to logical device designations resulting from the installation of the upgrade disk drive. Once installed, the program method optionally provides the user with the option of utilizing the upgrade disk drive as the new system boot device, or as a secondary/slave device. If the upgrade drive is to be used merely as a secondary drive, the program method can automatically transfer data and/or application files from the existing drive to the upgrade drive. If the upgrade drive is to be used as the new system boot device, the program method will automatically transfer operating system files from the preexisting drive to the upgrade drive, as well as any desired data and/or application files. Also, if the upgrade drive is to be used as the system boot drive, the method will provide the user with options for setting the appropriate system parameters. Thus, the upgrade drive can be designated as the boot drive by manipulating the appropriate jumper and cable settings, or the necessary changes can be invoked under the automatic control of the computer. Also, at the completion of the installation, the program method can be used to remove any transferred files from the preexisting drive, thereby freeing up storage space on that device.

15 Claims, 3 Drawing Sheets

FIG_1

FIG_2

METHOD AND APPARATUS FOR AUTOMATED DISK DRIVE UPGRADES

DESCRIPTION

1. Technical Field

The present invention relates to upgrading data storage on a computer system. More particularly, the invention is directed to a software based method for automatically installing and transferring data to a newly installed disk drive on a personal computer system.

2. Background Art

Typically, desktop computers, workstations and local area network servers utilize some form of read/write data storage device for the long term storage of operating systems, software applications and associated user data. This storage is usually in the form of a magnetic storage medium device, referred to variously as a disk drive, hard disk drive, disk storage, DASD, etc.

As the complexity and functionality of hardware and computer designs, operating systems, and applications software continues to evolve, the need for desktop computers with increased storage capacity also increases. This demand for greater storage capacity has further accelerated with the advent and proliferation of multimedia applications, which often involve the storage of large audio and video files, and with online services such as public internets, which provide a computer user with the ability to download and store large amounts of data. Indeed, users of desktop computer systems in the workplace, educational arena, and home, all have a seemingly insatiable appetite for greater storage capacity.

This increase in demand for computer storage has coincided with an evolution in the development of hard disk drive technologies and products, which has resulted in the availability of new drives that are smaller, faster, and that have increased storage capacities. Moreover, these advances—like other areas of computer technologies—have been accompanied by a continued decrease in the price of disk drives. As would be expected, this continued demand on storage space, coupled with the decline in prices, has resulted in users frequently upgrading their desktop computer systems.

Typically, a user is presented with two options when additional computer data storage is required. The first is to purchase an entirely new computer system that is equipped with a disk drive(s) having greater performance and larger storage capacity. The second, and often more cost effective alternative, is to upgrade the user's existing computer by installing one or more new disk drives that have increased storage capacity.

While upgrading an existing computer with a new disk drive(s) is often the more cost effective approach to increasing a user's available storage space, it is not without its drawbacks. Installation of a new drive often involves a series of time-consuming, error-prone steps. This is largely due to the fact that many of today's operating systems and software applications can not be simply "copied" from an existing disk, to a new upgrade disk, and then be operable. For instance, in a typical environment, the recommended procedure to follow when upgrading to a new disk drive is to first de-install the existing operating system and all existing software applications and then backing up all of the user and application data onto another media, such as tape or floppy disk. The new disk must then be physically installed and appropriately configured and formatted. The user must then reinstall and appropriately configure the operating system with the appropriate program and environment settings, and then reinstall each individual software application. Finally, the user and application data must be restored from the temporary media to the new disk.

Typically, each of these steps must be individually and separately performed, and the success of the upgrade will depend on the successful completion of each and every step. Often, the entire process is a multi-hour, or multi-day, operation. Moreover, the process is error prone, and can potentially result in an inoperative system or in loss of important computer data—errors which are especially common when the upgrade is performed by a computer novice.

Thus, what is needed is the ability to install a new disk drive in an existing computer system in a manner that is time efficient and not prone to error. Moreover, the process should be usable by computer novices, and should be capable of automatically transferring and configuring the operating system, applications and data from the old drive to the new upgrade drive.

SUMMARY OF THE INVENTION

The foregoing problems in the prior state of the art have been successfully overcome by the present invention, which is directed to a computer program method and apparatus for automatically upgrading a disk drive on a desktop computer system. With the present invention, the user physically installs the upgrade disk drive into an existing computer, and then executes the present software based method, which automatically configures the upgrade disk drive media and then transfers the operating system(s), software applications and application data from the old drive to the new drive. This configuration and transfer of applications and data is accomplished in a manner such that the upgrade drive can subsequently function as the default boot drive for the computer system.

In one preferred embodiment of the invention, once the transfer of system files, applications and data is complete, the user re-cables the disk drives in the system such that the new upgrade drive will function as the default boot drive. In another embodiment, the operating system and system parameters are automatically manipulated in a manner so as to virtually re-map the hardware address of the upgrade drive so that it is effectively viewed by the operating system as the default boot drive. This virtual re-mapping operation avoids any need for the user to physically change any cable or jumper settings. Under either approach, the user will have the option of keeping the old drive and using it for backing up data, keeping old files, etc., or it may be removed from the system altogether. Alternatively, the user can keep the preexisting drive as the boot drive, and utilize the upgrade drive as a secondary drive.

Since the present invention essentially automates the disk upgrade process, a user can quickly and easily upgrade an existing computer's disk storage capacity. The process eliminates many of the manual steps previously needed to perform an upgrade. Further, since the method automatically transfers the computer's existing operating system and applications, there is no need to perform a time consuming backup of the existing disk drive, and the user does not have to reinstall each computer software application to the new drive. Moreover, automation of the upgrade process eliminates any requirement that the user have detailed knowledge of complex operating system and hardware configuration procedures and commands, thereby allowing the upgrade to be performed by a novice computer user.

These and other features and advantages of the present invention will be set forth in the description which follows, and in part will be more apparent from the detailed description of a preferred embodiment, and/or from the appended claims, or may be learned by actual practice of the invention.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention contemplates both methods and apparatus for automatically upgrading a computer disk drive. By way of example and not limitation, the invention is described by making reference to figures illustrating the general computing environment in which the invention may be implemented, and to functional and flow diagrams that illustrate either the structure or processing flow of embodiments used to implement the method and apparatus. The diagrams should not be construed as limiting of the present invention's scope, but as illustrating an example of a presently understood preferred embodiment of the invention. Embodiments within the scope of the present invention may include computer readable media having executable instructions. Such computer readable media can be any available media which can be accessed by a general purpose personal computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions and which can be accessed by a general purpose computer. Combinations of the above should also be included within the scope of computer readable media. Executable instructions comprise, for example, instructions and data which cause a general purpose computer to perform a certain function or group of functions.

Figure 1:
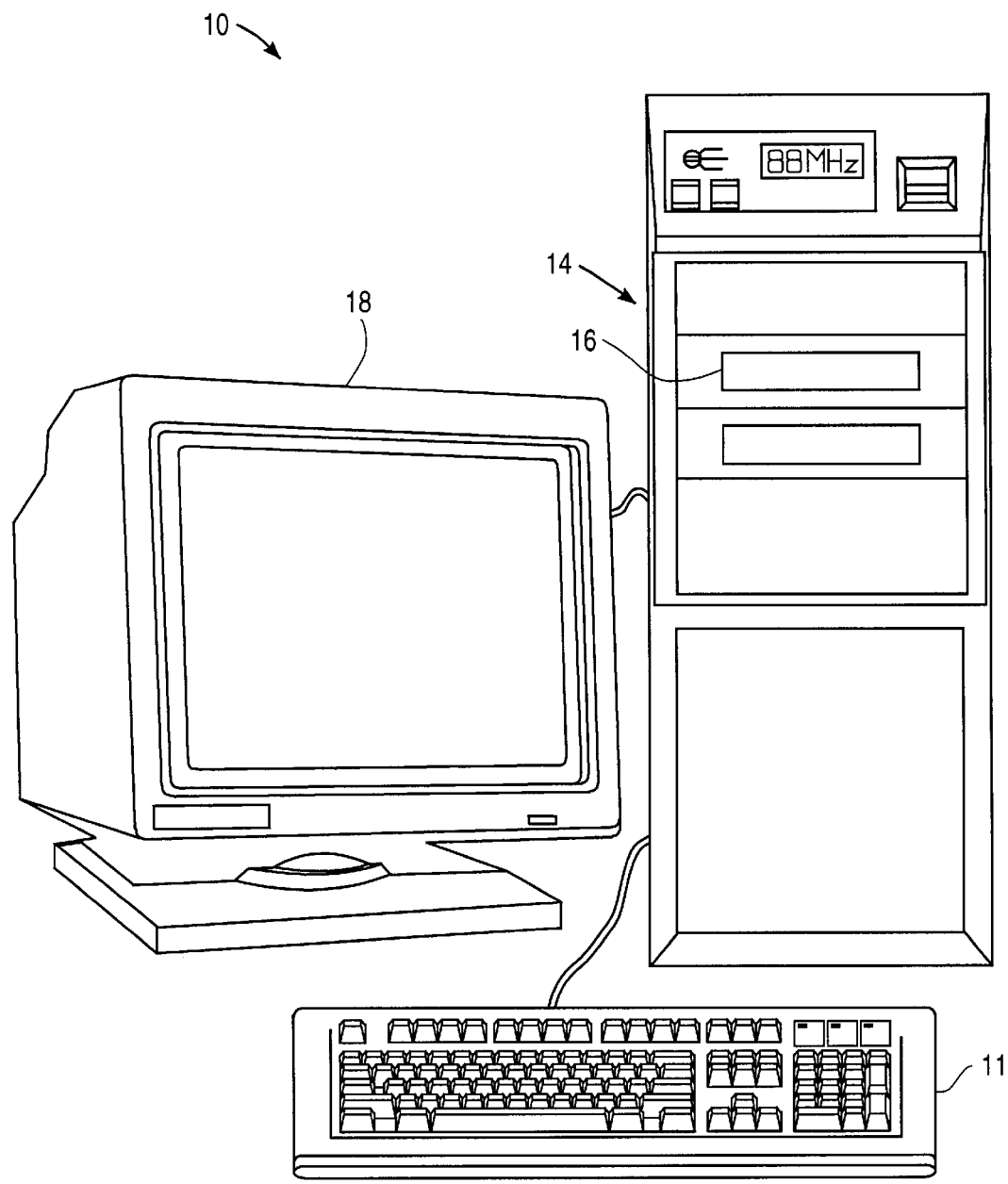
FIG. 1 is a system view of an example of a typical desktop computer environment in which the present invention would typically be utilized.
Figure 2:
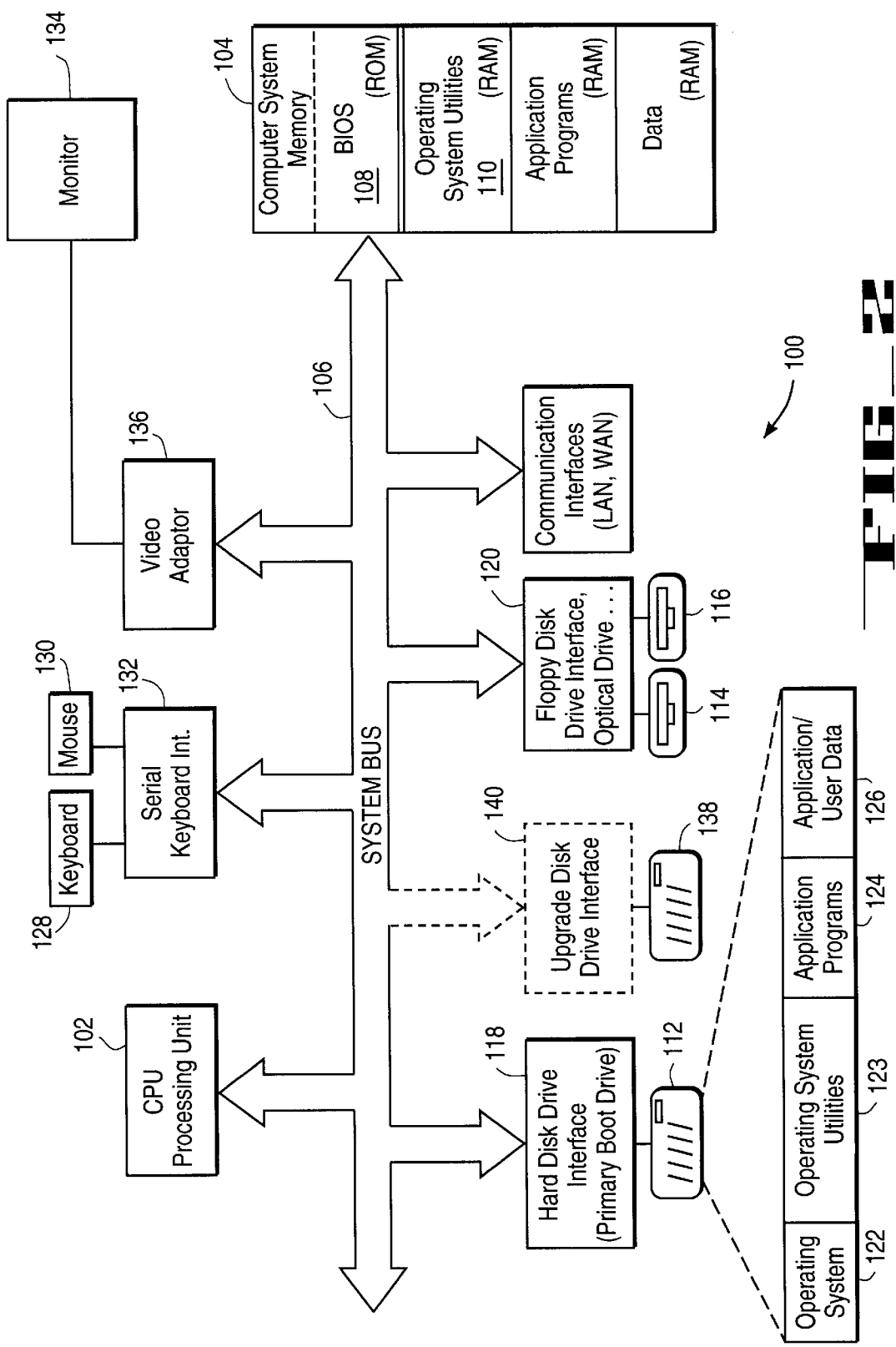
FIG. 2 is a functional block diagram illustrating one example of a suitable computing environment in which the present invention may be implemented.

FIGS. 1 and 2, and the accompanying discussion, provide an overview of an exemplary computing environment in which the present invention may be implemented. Those skilled in the art will appreciate that the invention may be practiced with other computer system configurations, including without limitation multi-processor systems, network PCs, minicomputers, and the like. The invention may also be practiced in distributed computing environments where tasks are performed by remote processing devices that are linked through a communications network. In a distributed computing environment, program modules may be located in both local and remote memory storage devices.

Referring first to FIG. 1, an example of a standard, desktop type personal computer is illustrated and designated generally at 10. As is shown, desktop computer 10 includes a standard computer keyboard 11, and computer monitor 18, both of which are operatively connected to the computer system chassis, designated generally at 14. The chassis is what houses the processing unit, computer system bus, power supply, and related computer electronics of the computer. In addition, a personal computer chassis 14 will typically include an area in which at least one type of computer storage device resides, such as is shown at 16. Computer storage will typically include, for instance, at least one hard disk drive, a magnetic floppy disk drive, an optical drive, etc. Often, the chassis 14 will also include space in which additional storage space can be installed at a later date and as the need arises.

Referring next to FIG. 2, an example of the functional blocks that make up a typical computer system of the type shown in FIG. 1 and in which the present invention could be utilized is shown generally at 100. Personal computer includes a CPU/processing unit 102, a computer system memory area 104, and a system bus 106 that interconnects each of the system components to the processing unit 102. The system bus 106 may be comprised of any type of bus structures that are commonly used in various computer architectures and implementations. As is shown, the computer system memory area includes, for instance, read only memory (ROM) 108 and random access memory (RAM) 110.

The ROM area may include a basic input/output system, which contains the basic routines that assist in the transfer of information between the various functional elements within the personal computer 100, such as during start-up of the computer.

The personal computer 100 may also include a hard disk drive 112 for reading from and writing to a hard disk, as well as other computer storage media, such as a magnetic disk drive 114 for reading from or writing to a removable magnetic disk, not shown, and an optical disk drive 116 for reading from or writing to removable optical disk such as a CD ROM or other optical media (not shown). The hard disk drive 112, magnetic disk drive 114, and optical disk drive 116 are connected to the system bus 106 by a hard disk drive interface 118, a magnetic disk drive-interface, and an optical drive interface (shown together at 120), respectively. The drives and their associated computer-readable media provide nonvolatile storage of computer readable instructions and data for the personal computer 100. Although the exemplary environment described herein employs a hard disk, a removable magnetic disk and a removable optical disk, other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

FIG. 2 illustrates how the hard disk drive 112, and its corresponding interface 118, together act as a primary boot drive for the computer system 100. Also shown is an optional upgrade hard disk drive 138 and a corresponding interface 140. The upgrade disk drive is typically installed by inserting the drive and interface into the computer chassis (14 in FIG. 1) and then making the appropriate electrical connections with the system bus 106, usually by way of a cable connection. An upgrade drive of this sort is typically added to the computer system 100 so as to increase and/or enhance the performance of the system's computer storage capacity.

Any one of a number of program modules may be stored on the hard disk(s), removable magnetic disk, optical disk, ROM 108 or RAM 110, including without limitation an operating system 122, one or more operating system utilities 123, one or more application programs 124, and related application and/or user data. A computer user can enter commands and data into the personal computer 100 through any one of a number of standard input devices, such as a keyboard 128 and "mouse" pointing device 130, connected to the processing unit 102 via appropriate interfaces, such as a keyboard interface and a serial port interface 132 that is in turn coupled to the system bus 106. A computer monitor 134 is also typically connected to the system bus 106 via an interface, such as a video adapter 136.

Figure 3:
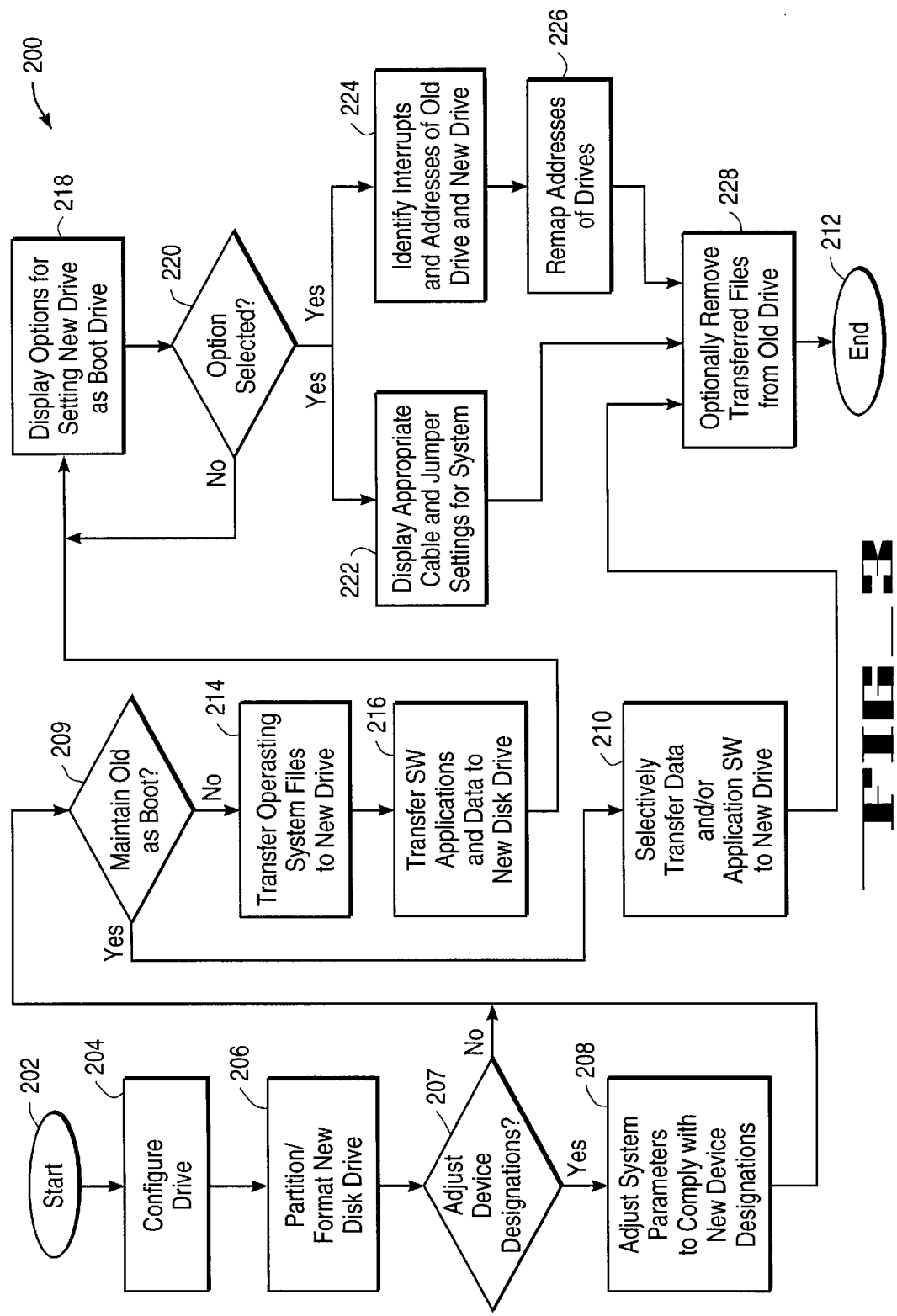
FIG. 3 is a flow chart diagram illustrating the program steps for one presently preferred embodiment of the invention.

Reference is next made to FIG. 3, which is a functional flow chart that illustrates an example of an overall program method, designated generally at 200, that can be used for carrying out the automated disk upgrade process. Preferably, the program method 200 would be implemented by way of a series of computer-executable instructions and commands, residing on a removable, computer readable medium, such as a floppy disk. The program instructions would be executable by the programmable processing unit/CPU 102, of the sort illustrated in FIG. 2 and present on general purpose personal computers, workstations, local area network servers and the like. Further, it will be appreciated that the functionality of the program method illustrated in FIG. 3 could be implemented by way of any one of a number of programming languages, or combination of languages.

The functional step labelled "Start" and shown at 202 in FIG. 3 corresponds to that point at which the user has physically installed a new upgrade disk drive (drive and corresponding disk drive interface, such as 138 and 140 in FIG. 2) in an existing personal computer system, such as that shown in FIGS. 1 and 2. Typically, and for purposes of this illustration, the new upgrade drive, will be installed in a system already equipped with a hard disk drive that is configured with a particular operating system, such as or Microsoft® DOS or Windows 95. Usually the existing drive is designated as the master or primary boot drive, and is configured, for example, in one partition with the drive letter c:. In addition to containing the operating system, the existing drive will typically contain various application programs, such as word processors, spreadsheets, databases, network applications, etc., as well as corresponding application and user data.

The new upgrade drive will be physically installed in an available slot or bay of the computer system (such as is shown at 16 in FIG. 1), and the appropriate connectors, cables and jumpers will be set such that the drive is initially identified as a slave, or secondary drive. Once installed, the user will power-up and restart the computer system.

In a preferred embodiment, the computer readable media containing the program method of the present invention, such as a floppy disk or CD ROM, will then be inserted into the appropriate drive of the computer, and the corresponding program instructions will loaded into the computer's CPU (102 in FIG. 2) and program memory (110 in FIG. 2) upon invocation of a corresponding command. Processing will then proceed, beginning at functional step 204 in FIG. 3.

Once the new drive has been physically installed, the operating system and hardware must be appropriately configured so that the new drive is recognized and useable by the operating system and computer hardware. This particular configuration occurs at functional step 204. The exact series of processing steps performed here will likely depend on the particular operating system being used, and may also depend on the particular computer hardware environment. Thus, the preferred program method may include a menu containing options for selection by the user, so that the particular operating environment can be selected, and the correct operating sequence followed. Once selected, the program method will cause the computer's CPU 102 to perform the appropriate series of steps for identifying the newly connected disk drive. These series of steps can be hard coded by way of computer executable instructions, or the program method may simply invoke the underlying operating system utilities necessary to configure and set-up a new disk drive. For instance, in one embodiment, the program method may invoke the BIOS setup utility for the computer, and perform an autodetect function to identify the new drive and set the appropriate operating parameters for the drive.

Once the new drive has been detected, the computer CPU will continue processing in accordance with the program method of FIG. 3, and proceed to functional step 206. At that step, the series of computer-executable instructions needed to appropriately partition and format the new drive will be performed. Again, while this particular function could be carried out exclusively by including the requisite program instructions for the particular operating system/computer hardware, in the preferred embodiment the program method will utilize the underlying utilities already present in the particular operating system to perform the function. For instance, in one embodiment, the program method would invoke the utility known as "fdisk." The utility would be supplied with the appropriate parameters (either automatically or via appropriate prompts to the user) so as to select the new upgrade drive and partition it.

Once partitioned, in the preferred embodiment the appropriate operating system utility will be invoked so as to then format the new disk. By way of example, the "format" utility will be invoked to format the new drive, which may be designated at this point with the drive letter d:. Once formatted, the new upgrade drive will be capable of receiving and storing data.

While the above configuration operation has been described in terms of "partitioning" and "formatting" the new disk, it will be appreciated that, depending on the operating system used, the applicable nomenclature may vary. Other suitable set-up and configuration operations could instead be used to initialize the upgrade disk drive.

In many operating systems the designation and assigning of a logical device identifier to the new drive, such as the drive letter d:, may affect the logical device designations previously assigned to other devices in the system. For instance, if prior to the installation of the upgrade disk drive the system was configured with a CD ROM optical disk drive, the logical device designation for that drive may be affected once the upgrade disk drive is installed. Prior to the installation of the upgrade disk drive, the CD ROM drive may have been designated as the d: drive. However, once the upgrade drive is installed and assigned that very same designation (i.e., the d: drive designation), many operating systems will automatically reassign the designation for the CD ROM drive, for instance, as the e: logical drive. Often, such a change would affect the operating and system parameters of the operating system and/or software applications, since there may be applications or system applications and/or utilities files that make reference to the CD ROM drive by way of its old designation, the lower case d: drive indicator. Of course, after the installation of the upgrade disk drive such a designation would no longer be accurate, resulting in various errors. As such, these inaccurate references to drive/device designations would need to be updated so that they correspond to the new designation for the affected devices, such as the CD ROM drive.

To address this potential problem, a preferred embodiment of the preferred invention includes a series of program steps that automatically updates any system and/or application references so that they comport with the new logical device designations. For example, at functional program step 207 in FIG. 3, the user would be presented with an option of adjusting any device designations that may have been altered by way of the installation of the new upgrade disk drive. If the user chooses to invoke this particular function, the CPU 102 will proceed to program step 208. At that functional step the processor 102 will perform a series of computer executable steps which function so as to adjust the system parameters in a manner so that any changes to logical device designations are appropriately reflected throughout the system. Thus, for instance, if the logical designation for the CD ROM drive has been changed to e:, all system files and/or application files that had previously referred to that drive as logical drive d:, would be modified so that they now refer to the drive by way of its new logical drive designation e:. Once the appropriate changes have been made the processor then proceeds to program step 209, as is indicated in FIG. 3.

Once the upgrade disk drive has been appropriately formatted, and the device designations in the system have been appropriately modified, if needed, the set of computer-executable instructions shown at functional step 209 are executed. At this point, the user is presented with an option of maintaining the pre-existing disk drive as the primary boot drive (e.g., the c: drive), and use the upgrade disk as a secondary/slave disk drive (e.g., the d: drive). If so, there is no need to transfer any of the operating system files from the old drive to the new upgrade drive, and the CPU 102 proceeds with the execution of the computer executable instructions represented at functional step 210.

At this functional step, the user may be presented with the option of selecting particular data and/or application software that is to be transferred from the old drive to the new upgrade disk drive. In one embodiment, the user could specify exactly which files should be transferred to the new drive. Alternatively, a menu or listing could be displayed on the computer monitor 134 that lists each of the application programs and/or data files that exist on the old drive, thereby providing the ability for the user to specify which of those files should be transferred over to the new upgrade disk drive. Of course, the user would also have the option of not transferring any files to the new upgrade drive. Once the specified files are transferred to the new drive, functional step 228 is performed, which provides the user with the option of removing transferred files from the old drive so as to free up additional computer storage space. Once the appropriate transfer has taken place, the CPU 102 proceeds to the functional step indicated at 212, at which point the processing ends.

If at functional step 209 the user instead chooses to not maintain the old drive as the boot drive but to instead move that functionality over to the new upgrade disk drive, the set of computer-executable instructions beginning at functional step 214 will be performed. At that step, a series of computer instructions are processed so as to effect the transfer/copy of the operating system files present on the old drive (e.g., currently drive c:), to the new upgrade drive (e.g., currently drive d:). In the illustrated example, the copy operation is such that all files will be copied to the upgrade drive, including all hidden and system files and all subdirectories.

Further, the copy operation must preserve all file and directory attributes when copied to the upgrade drive. Again, while a series of dedicated computer instructions can be used to accomplish the copy operation, the preferred embodiment utilizes an appropriate operating system utility, which is invoked and controlled by the program method. As before, the particular utility used will depend on the particular operating system used. For instance, in a Microsoft® DOS/Windows environment, a utility known as "XCOPY" utility could be utilized, in combination with the "FORMAT" utility, to perform the type of copy operation that would maintain the integrity of some of the operating system settings, registry entries, etc.

Once the operating system is copied to the upgrade drive, the processor performs the series of program instructions corresponding to the functional block shown at 216. That functional step is that portion of the program method that effects the copying of all the application software on the old drive to the new upgrade drive. In addition, any corresponding user data and files (e.g., word processing documents, spreadsheets, databases, etc.) are also copied to the new drive. Once again, in the preferred embodiment, the files are transferred by way of an appropriate operating system copying utility. While functional steps 214 and 216 are illustrated as comprising two different functional steps, in practice the steps could be combined and performed in one single copy operation. Alternatively, program step 216 could be implemented in a manner similar to that of program step 210, and only selected applications and/or data are transferred to this upgrade drive.

Processing then continues at functional step 218. This is the point in the program method where the user selects the manner by which the new drive will be assigned boot drive responsibilities. In the illustrated embodiment, the user is presented with a menu having several options at step 218, and the processor will loop until an option is selected at functional program step 220. Once an option is selected, the CPU 102 will proceed with the program steps that correspond with the particular option selected, as is shown.

By way of example and not limitation, in the preferred embodiment the user will have two options with respect to the method used for the configuration of the upgrade drive as the boot disk. First, the user may choose to make the new upgraded disk the new boot disk, and the old disk the slave or secondary disk, by simply powering the computer down, and switching the appropriate cables between the two disks and changing the appropriate switch or jumper settings depending on the particular hardware system. Second, the user may choose to make the upgrade disk the new boot disk, and the old disk the slave or secondary disk, by way of software manipulation of the operating system settings (e.g., making the old drive the d: drive, and the new drive the c: drive), instead of making any physical changes to the system.

FIG. 3 illustrates examples of the functional program steps corresponding to each of the above options. Thus, if at functional step 220 the user chooses to make the upgrade drive the new boot disk, and the old drive the slave or secondary disk by switching the appropriate cables between the two disks and changing the appropriate switch settings, the processor will proceed to program step 222. At this step, the program method can optionally cause the computer display screen to display to the user the particular cable and switch setting information that must be made so as to successfully re-assign the particular boot drive settings. Of course, this information would vary depending on operating system, disk drive and computer system configuration types, and information for different manufacturers could be stored and then displayed based on equipment specifications entered by the user. The user would then power the system down and set the new upgrade drive to be the master boot drive (i.e., drive c:) by making the appropriate cable and switch settings and then either remove the old drive, or re-cable and set the appropriate switch settings so that it functions as a slave/secondary drive (i. e., drive d:). The computer system would then be in a condition to subsequently boot from the newly installed upgrade drive.

In the example embodiment illustrated in FIG. 3, the user also has the option of automatically designating the new drive as the default boot drive. Under this option, the program method manipulates the operating system parameters so as to logically re-map the addresses of the two disk drives so that the new drive, previously drive d:, will be mapped as the default boot drive (i.e., drive c:), and the old drive, previously drive c:, will be mapped as the slave/secondary drive (i.e., drive d:). By way of example, this functional step is represented at step 224 in FIG. 3. There, the computer processor executes a series of program steps so as to identify from the operating system the interrupts and the physical addresses of the old disk (drive c:) and the new disk (drive d:). At step 226, those physical addresses are re-mapped to virtual interrupt addresses in a manner so as to effectively switch the physical addresses of the two drives, i.e., the old c: drive is now viewed by the operating system as the d: drive and vice versa. Once the virtually remapping of the drives is complete, the physical locations of the drives has not changed, but the logical functioning of the drives has—the new disk will effectively function as the default boot drive c:, and the old disk will function as the slave/secondary drive d:. Under this particular approach, the installation of the upgrade drive, and its designation as the default boot drive, is completely automatic and performed under the control of the software. No hardware manipulation or alteration is required on the part of the user.

Once the upgrade disk has been appropriately configured as the primary boot drive, the user then has the option of freeing up storage space on the old drive by removing all of the files that have been transferred from that drive to the new drive. This step is accomplished at program step 228, which can automatically remove all of the transferred files from the old drive or, alternatively, the user can specify exactly which of the files should be erased. In this way, the space on the old drive can be freed up for use as new data/application storage. Alternatively, the old drive can be completely physically removed from the computer system if the space is no longer needed.

Once functional step 228 has been performed, the processor proceeds to functional step 212 at which point the processing of the computer-executable instructions ends.

In summary, the above program method provides an easy-to-use computer program that automates the disk upgrade process. Instead of having to go through a series of manual, tedious and often error-prone operations, a user can simply install the new drive, and then execute the upgrade program to automatically transfer all system, application and data files to the new drive. Further, the program provides the user with several options with respect to the selection and configuration of the default boot drive, including an option of automatically designating the new drive as the boot drive. The program saves time, eliminates errors, and requires no specialized expertise on the part of the user.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

We claim:

1. A method for programmably installing an upgrade storage medium in a computer system which operates under the control of an operating system, the computer system having at least one preexisting storage medium having files stored thereon, the program method comprising the following program steps:

(a) automatically configuring the upgrade storage medium so that the upgrade storage medium is accessible by the computer system so as to be capable of receiving and storing data;

(b) automatically transferring preselected files from the preexisting storage medium to the upgrade storage medium; and (c) automatically configuring the upgrade disk drive to function as a primary boot device and the preexisting disk drive to function as a secondary disk drive by assigning a logical address to the upgrade disk drive which is mapped so as to correspond with a physical address of a primary boot device for the computer system, and by assigning a logical address to the preexisting storage medium which is mapped so as to correspond with a physical address of a secondary disk drive.

2. A method for programmably installing an upgrade storage medium as defined in claim 1, wherein the preselected files that are transferred from the preexisting storage medium to the upgrade storage medium comprise at least one software application.

3. A method for programmably installing an upgrade storage medium as defined in claim 1, wherein the preselected files that are transferred from the preexisting storage medium to the upgrade storage medium include the operating system files.

4. A method for programmably installing an upgrade storage medium as defined in claim 3, wherein the copying of the operating system to the upgrade storage medium is performed in a manner so as to preserve all file and directory attributes of operating system files copied.

5. A method for programmably installing an upgrade storage medium as defined in claim 1, further comprising the program step of optionally removing from the preexisting storage medium any of the preselected files that are transferred from the preexisting storage medium to the upgrade storage medium.

6. A method for programmably installing an upgrade storage medium as defined in claim 1, wherein the automatic configuration program step includes the step of partitioning and formatting the upgrade storage medium and assigning the upgrade storage medium a logical drive designation.

7. A method for programmably installing an upgrade storage medium as defined in claim 6, further including the program step of updating logical drive designation references, wherein reference to any logical drive designations within at least one file stored on the computer system are changed so as to correspond to logical drive designations resulting in the computer system as a result of the automatic configuration step.

8. A method for programmably installing an upgrade storage medium as defined in claim 1, further comprising the program step of providing a computer user with a plurality of user-selectable options for selecting the manner by which the upgrade storage medium is to be configured as the primary boot device for the computer.

9. A computer-readable medium having computer-executable instructions for performing the steps recited in claim 1.

10. A computer-readable medium having stored thereon computer-executable instructions which, when executed by a processor, cause the processor to perform the steps of:

(a) automatically configuring an upgrade computer disk drive that has been physically installed in a computer system having at least one preexisting storage medium, the upgrade computer disk being configured in accordance with the requirements of an operating system present on the preexisting disk drive so that the upgrade computer disk drive functions as a secondary disk drive on the computer system and is capable of receiving and storing data;

(b) automatically causing the operating system files stored on the preexisting disk drive to be copied from the preexisting disk drive to the upgrade disk drive in a manner so as to preserve all file and directory attributes of operating system files copied; and (c) automatically configuring the upgrade disk drive to function as the master boot drive and the preexisting disk drive to function as a secondary disk drive by assigning a logical address to the upgrade disk drive which is mapped so as to correspond with a physical address of a primary boot device for the computer system, and by assigning a logical address to the preexisting disk drive which is mapped so as to correspond with a physical address of a secondary disk drive.

11. A computer-readable medium as defined in claim 10, wherein the automatic configuration program step includes the step of partitioning and formatting the upgrade disk drive and assigning the upgrade disk drive a logical drive designation.

12. A computer-readable medium as defined in claim 11 further having stored thereon computer-executable instructions which, when executed by a processor, cause the processor to perform the step of updating logical drive designation references, wherein reference to any logical drive designations within at least one file stored on the computer system are changed so as to correspond to logical drive designations resulting in the computer system as a result of the automatic configuration step.

13. A program method for automating the installation and configuration of an upgrade computer disk drive in a desktop computer, the computer having a preexisting disk drive on which is stored at least one operating system, the preexisting disk drive functioning as the computer system master boot drive, the program method comprising the following program steps:

(a) configuring the upgrade computer disk drive in accordance with the requirements of the operating system present on the preexisting disk drive so that the upgrade computer disk drive functions as a secondary disk drive on the computer system;

(b) causing the operating system stored on the preexisting disk drive to be copied from the preexisting disk drive to the upgrade disk drive in a manner so as to preserve all file and directory attributes of operating system files copied; and (c) providing a computer user with a plurality of user-selectable options for selecting which of the drives is to function as the primary boot drive for the computer system, said options including:

(i) maintaining the preexisting disk drive as the primary boot drive and the upgrade disk drive as the secondary drive; and (ii) automatically changing the upgrade disk drive so that it is configured as the primary boot device for the computer system and changing the preexisting disk drive so that it functions as a secondary disk drive for the computer system.

14. A program method for automating the installation of an upgrade disk drive as defined in claim 13, wherein the user-selectable option for automatically changing the upgrade disk drive so that it is configured as the primary boot device is performed by manipulating a logical address of the upgrade disk drive so that it is mapped so as to correspond with a physical address of a primary boot device for the computer system, and manipulating the logical address of the preexisting disk drive so that it is mapped so as to correspond with a physical address of a secondary device for the computer system.

15. A computer-readable medium having computer-executable instructions for performing the steps recited in claim 14.

* * * * *